June 8, 1965     J. E. DUGGAN     3,187,590

LUBRICATING ASSEMBLY HAVING A PRESSURE VENTING SEAL

Filed Aug. 31, 1962     2 Sheets-Sheet 1

INVENTOR.
JAMES E. DUGGAN

BY Whittemore, Hulbert & Belknap

ATTORNEYS

June 8, 1965   J. E. DUGGAN   3,187,590
LUBRICATING ASSEMBLY HAVING A PRESSURE VENTING SEAL
Filed Aug. 31, 1962   2 Sheets-Sheet 2

INVENTOR.
JAMES E. DUGGAN
BY
Whittemore, Hulbert & Belknap
ATTORNEYS

United States Patent Office 3,187,590
Patented June 8, 1965

3,187,590
LUBRICATING ASSEMBLY HAVING A
PRESSURE VENTING SEAL
James E. Duggan, Berkley, Mich., assignor, by mesne assignments, to Watts Electric & Mfg. Co., Birmingham, Mich., a corporation of Delaware
Filed Aug. 31, 1962, Ser. No. 220,631
3 Claims. (Cl. 74—18)

This invention relates generally to lubricating assemblies, such for example as ball joint assemblies, universal joint assemblies, or any other type of assembly requiring lubricant under pressure.

One of the essential objects of the invention is to provide a lubricating assembly having means for receiving a lubricant under pressure and having a pressure venting seal embodying my invention.

Another object is to provide a lubricating assembly having means for receiving a lubricant under pressure and having a pressure venting seal provided with means capable of normally preventing the discharge of lubricant from the assembly but capable of opening automatically and serving as a vent for lubricant when an excess quantity thereof is supplied to said assembly.

Another object is to provide a lubricating assembly having means for receiving a lubricant under pressure and having a pressure venting seal provided with an integral projection containing normally closed means capable of normally preventing the discharge of lubricant from the assembly but capable of opening automatically and serving as a vent for lubricant when an excess quantity thereof is supplied to said assembly.

Another object is to provide a lubricating assembly having means for receiving a lubricant under pressure and having a pressure venting seal provided with an integral upstanding substantially conical projection containing normally closed means capable of normally preventing the discharge of lubricant from the assembly but capable of opening automatically and serving as a vent for lubricant when an excess quantity thereof is supplied to said assembly.

Another object is to provide a lubricating assembly wherein the pressure venting seal is preferably formed from flexible material such as a plastisol vinyl, and is provided with an integral annular attaching flange that is firmly secured to and has sealing engagement with a tubular housing of the lubricating assembly.

Another object is to provide a lubricating assembly wherein the pressure venting seal envelops a movable stud projecting from the tubular housing and is capable of flexing without contacting any other part or element capable of causing abrasive wear.

Another object is to provide a pressure venting seal wherein the integral upstanding substantially conical projection containing the normally closed means is preferably located at the top of the pressure venting seal, but may be located at any suitable point of said pressure venting seal.

Another object is to provide a pressure venting seal that is simple in construction, economical to manufacture, and efficient in use.

Other objects, advantages and novel details of construction of this invention will be made more apparent as this description proceeds, especially when considered in connection with the accompanying drawings wherein.

Figure 1:
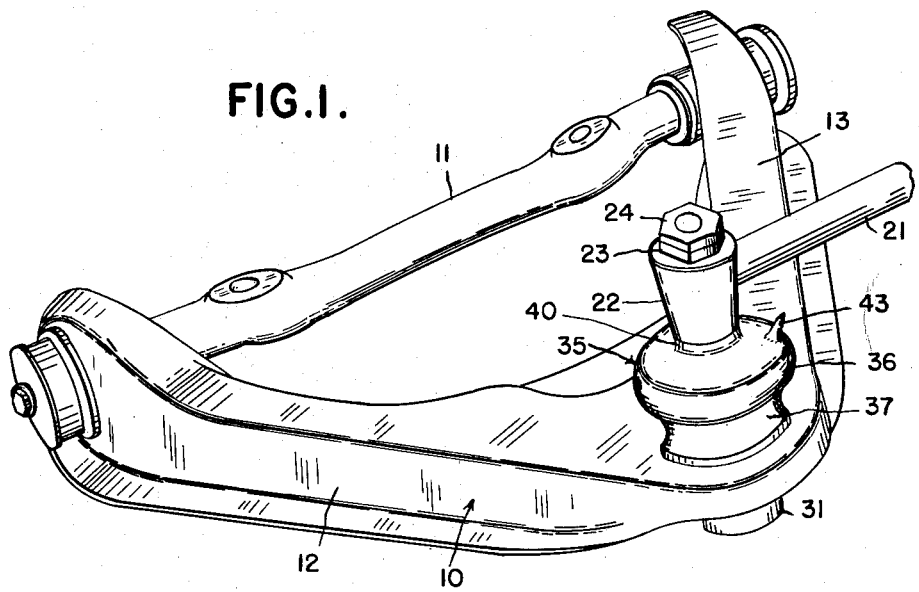
FIGURE 1 is a perspective view of a lubricating assembly and its supporting frame, and showing a portion of a radius rod connected to a movable stud of the lubricating assembly.
Figure 3:
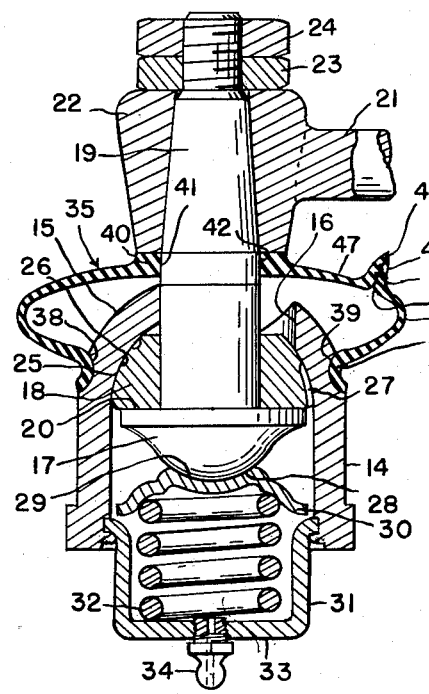
FIGURE 3 is a vertical sectional view through the lubricating assembly.
Figure 4:
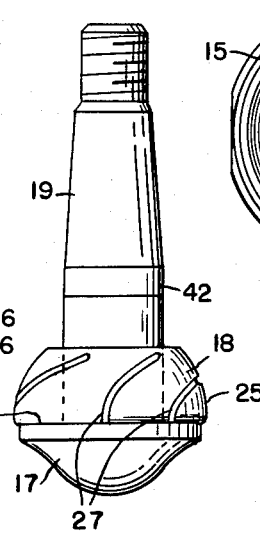
FIGURE 4 is an elevational view of the movable stud and bearing.
Figure 2:
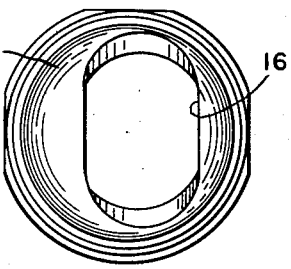
FIGURE 2 is a top plan view of the housing.
Figure 5:
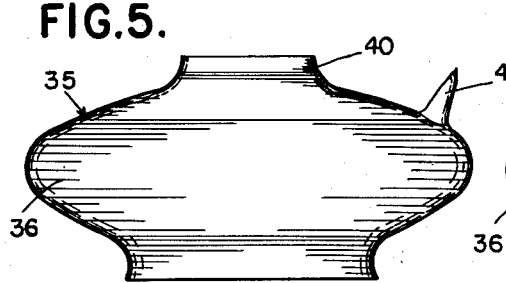
FIGURE 5 is an elevational view of the pressure venting seal.
Figure 6:
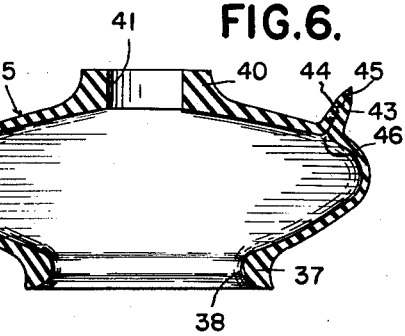
FIGURE 6 is a vertical sectional view through the pressure venting seal.

Referring now to the drawings, 10 is a substantially V-shaped supporting frame, and 11 is a transversely extending bar extending between and terminally connected to the arms 12 and 13 respectively of the V-shaped frame at the free ends thereof. Such frame 10 and arm 11 form a substantially triangular shaped unit which may be secured by any suitable means (not shown) to the chassis of a motor vehicle.

At the apex of the V-shaped supporting frame 10 is securely mounted a downwardly opening tubular housing 14 having at its upper end a concavo-convex dome 15 provided with a transversely extending slot 16. Located within said housing 14 is a semiround head 17 and a semiround bearing 18 which cooperate with each other to form a sectional ball, while projecting outwardly through the semiround bearing 18 and the transversely extending slot 16 is a movable stud 19 integral with the flat portion 20 of the semiround head 17. A laterally projecting radius rod 21 of a steering mechanism of a motor vehicle has at one end an integral upright tubular portion 22 that is sleeved upon the free end of the stud 19 and is secured thereto by suitable nuts 23 and 24 which threadedly engage the free end of the stud 19.

The round portion 25 of the semiround bearing 18 of the sectional ball engages the concave inner surface 26 of the dome 15 of the housing 14 and is provided with circumferentially spaced longitudinally curved grooves 27 for lubricant, while the round portion 28 of the semiround head 17 engages a concave central portion 29 of a washer 30 within and of smaller diameter than the interior diameter of the tubular housing 14.

Rigidly secured to the housing 14 at the downwardly opening end thereof is an outwardly projecting cup-shaped cover 31 which opens inwardly toward the interior of the housing 14 and which cooperates with the washer 30 to receive therebetween a relatively heavy coil spring 32 that terminally engages the underside of the washer 30 and the base 33 of the cup-shaped cover 31. Located axially in the base 33 of the cup-shaped cover is a fitting 34 through which a suitable lubricant is adapted to be supplied under pressure to the interior of the lubricating assembly.

My improvement comprises a pressure venting seal 35 which is mounted on the lubricant discharge side of the lubricating assembly. More specifically, the pressure venting seal 35 comprises a hollow substantially globular body 36 formed from a flexible material such as plastisol vinyl. Such globular body 36 envelops the dome 15 of the tubular housing 14 and is provided at the bottom thereof with an integral inwardly projecting open return bent annular attaching flange 37 that defines a circular opening 38 and that fits tightly within and has sealing engagement with an annular groove 39 in the outer surface of the tubular housing 14 adjacent the dome 15 thereof. Such globular body 36 is provided at the top thereof with an annular flange 40 that defines a circular opening 41 and that fits tightly about and has sealing engagement with an annular portion 42 of the movable stud 19.

The globular body 36 is also provided, preferably at one side of the flange 40, with an integral upstanding substantially conical projection 43 having axially thereof a wavy thin upwardly extending slit or passage 44 and a thin upwardly extending slit or passage 45. Preferably the wavy slit or passage 44 communicates with an inverted V-shaped recess 46 that extends downwardly through the top wall 47 of the globular body 36, while the slit or passage 45 constitutes an endwise extension of the wavy passage 44 and extends upwardly through the upper end of the conical projection 43. Normally both slits or passages 44 and 45 are closed by the material of the projection 43 to prevent the discharge or escape of lubricant from the interior of the globular body 36. However, the slits or passages 44 and 45 are opened automatically when an excess quantity of lubricant is supplied under pressure to the lubricating assembly, and thus provide vents through which the lubricant may be discharged.

Figure 8:
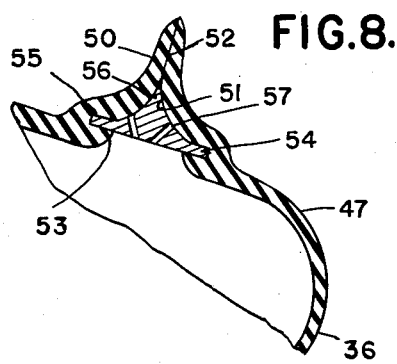
FIGURE 8 is a view similar to FIGURE 7 but showing a modification wherein a valve element and a slit are provided in the conical projection of the globular body.
Figure 9:
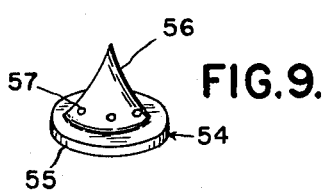
FIGURE 9 is a detailed perspective view of the valve element shown in FIGURE 8.
Figure 12:
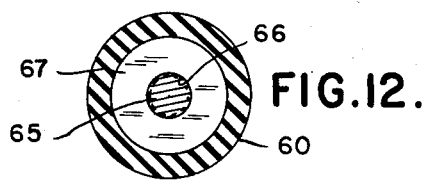
FIGURE 12 is a cross-sectional view taken substantially on the line 12—12 of FIGURE 11.
Figure 10:
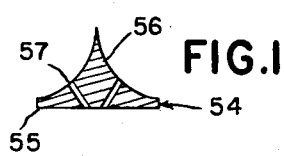
FIGURE 10 is a vertical sectional view through the valve element shown in FIGURE 9.

In FIGURES 8 to 10 inclusive, I have shown a slight modification wherein the globular body 36 is provided with an integral upstanding substantially conical projection 50 having axially thereof a conical recess 51 and a thin upwardly extending slit or passage 52. Preferably the conical recess 51 communicates with a vertical opening 53 that extends downwardly through the top wall 47 of the globular body 36, while the slit or passage 52 constitutes an endwise extension of the conical recess 51 at the apex thereof and extends upwardly through the upper end of the conical projection 50. Located within the conical recess 51 is a metal valve element 54 having a substantially flat circular base 55 anchored within the conical projection 50 and having an upstanding conical portion 56 integral with the upper surface of the base, preferably at the center thereof, and normally engaging the side walls of the conical recess 51. Upwardly diverging passages 57 in communication with the vertical opening 53 extend through the base 55 and conical portion 56 of the metal valve element 54, and are normally closed by the side walls of the conical recess 51 to prevent the discharge or escape of lubricant from the interior of the globular body 36. However, the side walls of the conical recess 51 are moved slightly away from the side walls of the conical portion 56 of the metal valve element to uncover the upper ends of the upwardly diverging passages 57, and the slit or passage 52 is opened automatically when an excess quantity of lubricant is supplied under pressure to the lubricating assembly to provide vents through which the lubricant may be discharged.

Figure 11:
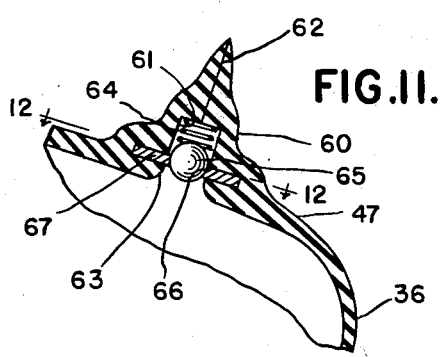
FIGURE 11 is a view similar to FIGURE 7 but showing another modification wherein a ball valve and a slit are provided in said conical projection for controlling the discharge of lubricant from the pressure venting seal.

In FIGURE 11, I have shown another modification wherein the globular body 36 is provided with an integral upstanding substantially conical projection 60 having axially thereof a cylindrical recess 61 and a thin upwardly extending slit or passage 62. Preferably, the cylindrical recess 61 registers with a vertical opening 63 that extends downwardly through the top wall 47 of the globular body 36, while the slit or passage 62 constitutes an endwise extension of the recess 61 at the upper end thereof and extends upwardly through the upper end of the conical projection 60. Located within the recess 61 is a coil spring 64 that normally holds a ball valve 65 seated in engagement with the edges of a circular opening 66 in a transversely extending plate 67 embedded in the conical projection 60 at the bottom thereof to prevent the discharge or escape of lubricant from the interior of the globular body 36. However, the ball valve 65 is moved automatically against the tension of the spring 64 from the opening 66 in the plate 67, and the slit or passage 62 is opened automatically when an excess quantity of lubricant is supplied under pressure to the lubricating assembly to provide vents through which the lubricant may be discharged.

Figure 7:
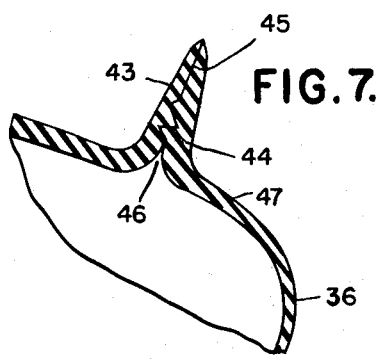
FIGURE 7 is an enlarged fragmentary vertical sectional view through the integral upstanding substantially conical projection illustrated in FIGURES 1, 3 and 6 and showing two forms of slits in said projection for controlling the discharge of lubricant from the pressure venting seal.

Thus, in each form of pressure venting seal, the integral substantially conical projection contains normally closed means, such as the slits or passages 44 and 45 in FIGURE 7, or the side walls of the conical recess 51 and the slit or passage 52 in FIGURE 8, or the ball valve 65 and the slit or passage 62 in FIGURE 11, to normally prevent the discharge or escape of lubricant.

In each instance, the normally closed means in the integral upstanding substantially conical projection is capable of opening automatically when an excess quantity of lubricant is supplied under pressure to the lubricating assembly to provide vents through which lubricant may be discharged. Such integral upstanding substantially conical projection containing the normally closed means is preferably located on the top wall 47 of the globular body 36 at one side of the flange 40, but may be located at any suitable point of said globular body.

Also, in each instance, the pressure venting seal 35 is formed from flexible material such as plastisol vinyl and is capable of flexing with the stud 19 while remaining firmly mounted on the tubular housing 14 of the lubricating assembly. In this connection, the pressure venting seal 35 is capable of flexing without contacting any other part or element capable of causing abrasive wear.

In use, lubricant is supplied under pressure through the fitting 34 to the interior of the cover 31 of the lubricating assembly. Such lubricant passes upwardly in the cover 31 between the convolutions of the spring 32, thence upwardly between the washer 30 and the housing 14 to the curved grooves 27 in the round portion 25 of the semi-round bearing 18 and thence upwardly about the movable stud 19 in the transversely extending slot 16 to the interior of the globular body 36 of the pressure venting seal. In each form of pressure venting seal the normally closed means aforesaid will normally prevent the discharge or escape of lubricant from the globular body 36 but will permit the discharge of lubricant from the globular body 36 when an excess quantity of lubricant is supplied under pressure to the lubricating assembly.

What I claim as my invention is:

1. A pressure venting sealing assembly adapted to receive lubricant from the dome of a housing containing an upwardly and outwardly projecting stud, comprising a hollow substantially globular body formed from flexible material, provided at the bottom thereof with an annular flange adapted to envelop and to be rigidly secured to said dome, and having at the top thereof an annular flange adapted to fit tightly about and to have sealing engagement with said stud, said gobular body having a top wall provided with an integral upstanding projection containing a normally closed longitudinally extending slit adapted when opened to communicate with the atmosphere at the upper free end of said upstanding projection and adapted to communicate with the interior of said globular body, said slit being adapted to be opened by said lubricant to establish communication with the atmosphere and the interior of said globular body when an excess quantity of lubricant is supplied under pressure to said slit from said globular body, said upstanding projection being conical in configuration and containing at the lower end of said slit a recess in communication with both the interior of said globular body and said slit, and a metal valve element mounted within said recess and having passages for lubricant therethrough in communication with the interior of said globular body and normally closed by walls of said recess.

2. The pressure venting sealing assembly defined in claim 1, wherein the recess in said conical projection is conical in configuration, wherein the metal valve element has an upstanding conical portion within and normally engaging the side walls of the conical recess in said conical projection, and wherein the metal valve element has passages for lubricant in communication with the interior of said globular body and normally closed by the side walls of said conical recess, whereby said side walls, when subjected to an excess quantity of lubricant from said passages, are movable by said lubricant away from the conical portion of said valve element to thereby permit the lubricant in said passages to flow to and through the slit in said conical projection.

3. The pressure venting sealing assembly defined in claim 2, wherein the metal valve element has a substantially flat base anchored within said conical projection, and has upwardly diverging passages for lubricant in communication with the interior of said globular body, extending through opposite side walls of said upstanding conical portion, and normally closed by the side walls of said conical recess, and wherein the side walls of said conical recess, when subjected to an excess quantity of lubricant from said upwardly diverging passages, are movable by said lubricant away from the conical portion of said valve element to uncover the outer ends of said upwardly diverging passages to thereby permit the lubricant in said upwardly diverging passages to flow to and through the slit in said conical projection.

References Cited by the Examiner

UNITED STATES PATENTS

| | | |
|---|---|---|
| 2,305,265 | 12/42 | LeTourneau. |
| 2,644,663 | 7/53 | Klingler _____ 137—525.1 |
| 2,830,832 | 4/58 | Moorman et al. _____ 308—187.2 |
| 2,973,230 | 10/61 | Eastburg _____ 308—185 |
| 3,135,539 | 6/64 | Ulderup et al. _____ 287—87 |

FOREIGN PATENTS

| | | |
|---|---|---|
| 177,009 | 10/61 | Sweden. |
| 1,265,007 | 5/61 | France. |

BROUGHTON G. DURHAM, *Primary Examiner.*

FRANK SUSKO, ROBERT C. RIORDON, *Examiners.*